United States Patent [19]

DevChoudhury

[11] 4,240,064
[45] Dec. 16, 1980

[54] POWER LIMITING CIRCUIT FOR BAR CODE READER

[75] Inventor: Rathindra N. DevChoudhury, Ithaca, N.Y.

[73] Assignee: NCR Corporation, Dayton, Ohio

[21] Appl. No.: 941,503

[22] Filed: Sep. 11, 1978

[51] Int. Cl.² .............................................. G06K 7/14
[52] U.S. Cl. .......................... 340/146.3 AG; 235/455; 235/462; 250/568; 340/146.3 H
[58] Field of Search .............. 340/146.3 H, 146.3 AG, 340/146.3 R, 146.3 Z, 146.3 SY; 250/214 R, 567, 568; 235/455, 462, 463, 474

[56] References Cited

U.S. PATENT DOCUMENTS

| | | | |
|---|---|---|---|
| 3,925,639 | 12/1975 | Hester | 235/462 |
| 3,944,979 | 3/1976 | Kwok | 340/146.3 AG |
| 4,072,859 | 2/1978 | McWaters | 250/568 |
| 4,101,072 | 7/1978 | Weaver et al. | 235/455 |

*Primary Examiner*—Leo H. Boudreau
*Attorney, Agent, or Firm*—J. T. Cavender; Wilbert Hawk, Jr.; Richard W. Lavin

[57] ABSTRACT

A control circuit limits the power supplied to a bar code reader system only to the particular point in time that a bar code located on a record member is being read by an optical wand. Control signals are generated during the time the reader system is not in a reading mode, which reduces the amount of power supplied to the reader system. Upon entering a read mode as determined by signals generated by the optical wand, power is supplied for a predetermined time sufficient to read the bar code on the record member. A plurality of single-shot multivibrators generate control signals for cyclically interrupting the power supply when the reader system is in a non-read mode, thereby reducing the amount of power consumed by the reader system. Upon entering a read mode, another single-shot multivibrator outputs a plurality of pulses enabling the power to be supplied to the reader system allowing the optical wand to read the bar code on the record member and the reader system to transmit the data to a central processor.

14 Claims, 3 Drawing Figures

POWER LIMITING CIRCUIT FOR BAR CODE READER

BACKGROUND OF THE INVENTION

The present invention relates generally to bar code readers and more particularly, to a power supply control circuit for allowing the reader system to receive full power only during the time the system is in a read mode. Present-day bar code reader systems include an optical wand for sensing the black and white bars which constitute the bar code, i.e., the bars forming coded binary data, the bar being printed on an article or a tag attached to the article to which the data pertains. The reader system further includes reader electronics for converting the signals generated by the optical wand in reading the bar code into digital data and for processing such data.

Present-day merchandise checkout systems include the use of bar code readers for reading data associated with merchandise items purchased by the customer, the data may include manufacturer number, merchandise number, etc. Normally the power supplied to the reader system is on during the time the checkout counter is available for operation. It has been found that during an average day of operation, the time the optical wand is actually in use in reading the coded labels or articles is a fraction of the time that the check-out counter is in operation. In view of the increased costs of electrical power, it is desirable to reduce the power consumption of the bar code reader system, thereby reducing its cost of operation and therefore enhancing its value to the proprietor.

At the present time, portable bar code reader systems are in existence which are battery powered. In order to conserve the life of the battery in such systems, circuits have been devised for limiting the power supply to the optical wand to the time the wand is actually sensing a label or article. Examples of this type of circuit may be found in U.S. Pat. No. 3,925,639 and U.S. Pat. No. 4,072,859. While these control circuits perform their intended task, they are complex and costly. It is therefore a principal object of this invention to provide an improved circuit for controlling the power supplied to a bar code reader system used in a merchandise check-out arrangement. It is a further object of this invention to provide such a circuit which is simple in its construction, and therefore, low in cost.

SUMMARY OF THE INVENTION

In accordance with the present invention, control circuits are provided for use with a bar code reader system in which an electronic switch located in a power supply circuit is intermittently operated to supply power to the reader electronics and to the light source of an optical wand associated with the reader electronics in order for the optical wand to intermittently sense the surface that is being positioned adjacent the reading head of the wand. This intermittent operation continues as long as the optical wand is not sensing a reflecting surface of an article or a label. Upon the sensing of a reflecting surface by the optical wand indicating that a bar code is positioned to be read by the wand, the intermittent control circuit is deenergized and an energizing circuit is enabled for a predetermined length of time to control the switch in order for power to be continuously supplied to both the optical wand and the reader electronics. The time the energizing circuit is enabled is sufficient for the optical wand to read the bar code on the label or article and the reader electronics to process the signals generated by the optical wand during such read operation. Single-shot multivibrators are used to provide the control pulses necessary for the circuits to function.

BRIEF DESCRIPTION OF THE DRAWINGS

For a complete understanding of the present invention, and the technical advance represented thereby, reference is now made to the following description, taken in conjunction with the accompanying drawings in which.

DESCRIPTION OF THE PREFERRED EMBODIMENT

Figure 1:
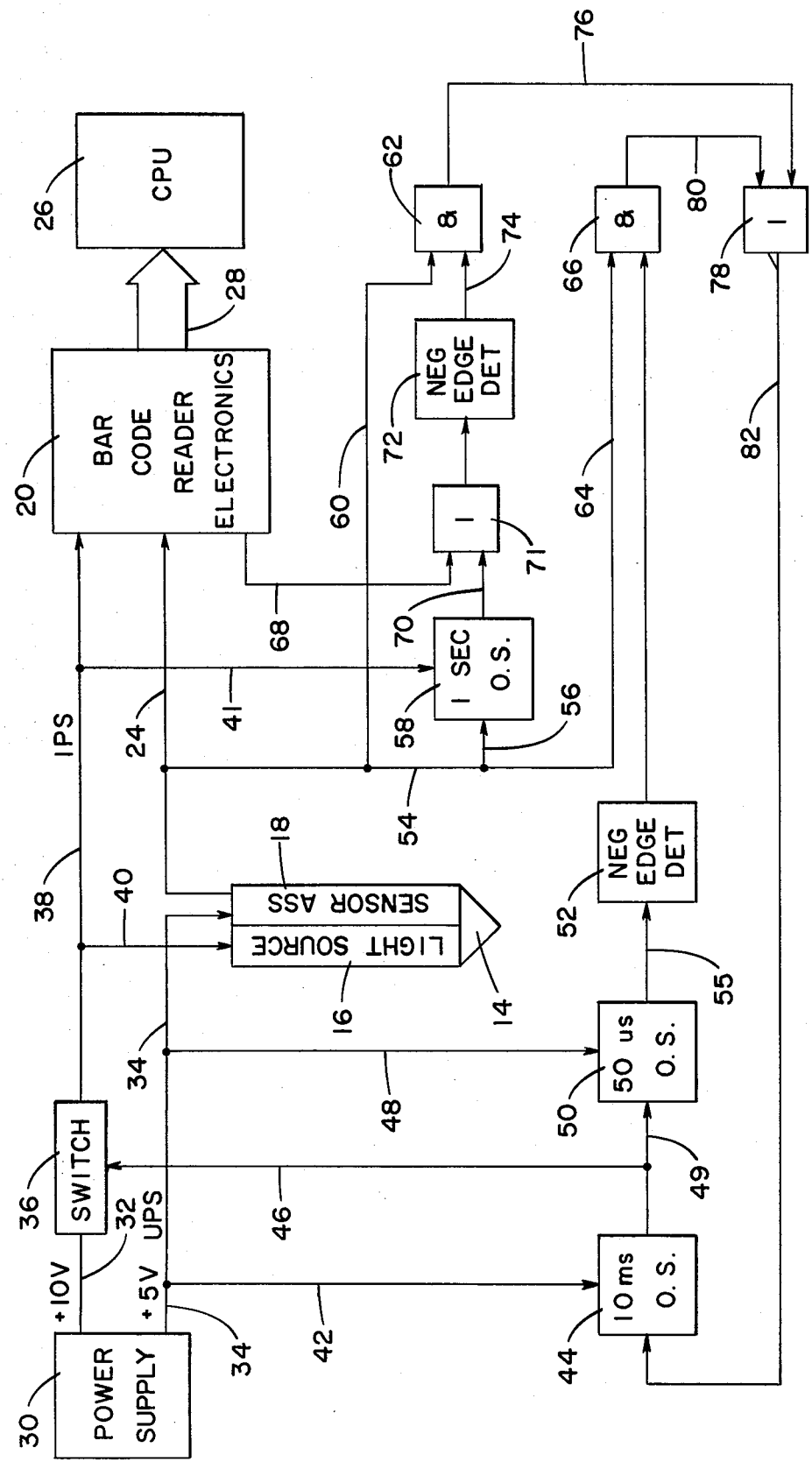
FIG. 1 is a block diagram illustrating the overall control circuit of the invention.

Referring now to FIG. 1, there is shown a block diagram of the power supply control circuit which constitutes the present invention. Included in the circuit is an optical wand 14 which is of conventional construction, including a light source 16 for projecting a light beam through the nose or head of the optical wand 14, which light beam when reflected from a surface, is picked up by a sensor assembly 18 which may include a conventional analog-to-digital converter (A/D), not shown, for converting the signals generated by the sensor into digital pulses for transmission over line 24 to the bar code reader electronics 20. Since the construction of the wand 14 is well known in the art and is not pertinent to an understanding of the present invention, no further details of the wand will be given. The bar code referred to in the present embodiment is the well-known Universal Product Code (UPC) which is composed of alternating black and white bars to form a code although the present invention is applicable to the reading of any type of code having a plurality of different distinctive coded elements. The reader electronics 20 may include the signal conditioning and processing circuitry for converting the digital pulses generated by the wand 14 into the appropriate binary data and processing such data for transmission over a bus 28 to a central processing unit 26 in a manner that is well-known in the art.

A power supply 30 is provided which outputs over line 32 an interrupted +10 volts power supply, and over line 34 an uninterrupted +5 volts power supply. The interrupted power supply is transmitted over line 32 to an electronic switch 36 which, when switched on, will output +15 volts over line 38 to the reader electronics 20; over line 40 to the light source 16 in the wand 14 and over line 41 to a single-shot multivibrator 58. During the time the wand 14 and the reader electronics 20 are energized, any signals generated by the wand 14 will be processed by the reader electronics 20. The uninterrupted 5 volts power supply is continuously transmitted over lines 42 and 48 to single-shot multivibrators 44 and 50 in addition to the sensor assembly 18 of the optical wand 14 over line 34. It will be seen from this construction that the uninterrupted power supply is always present to condition the circuit for operation upon the sensing of a predetermined signal by the wand 14 as will be described more fully hereinafter.

As is well-known in the art, the wand 14 will output over line 24 a high or +5 volts pulse 23 (FIG. 3) when sensing a black bar of a bar code or a non-reflecting surface and whose output will go low or 0 volts 21 upon sensing a white bar of a bar code or a reflecting surface. Thus, when the wand is not in use or not positioned adjacent a reflective surface, it will see in effect a black surface and therefore will output the 5 volts pulse 23 (FIG. 3) over line 24. The 5 volts pulse outputted by the wand 14 is also transmitted over lines 54 and 64 (FIG. 2) to one input of an AND gate 66, thereby conditioning the AND gate for operation. Further included in the power supply control circuit is the single-shot multivibrator 44 (FIG. 1) which, when triggered, outputs a +5 volts pulse 45 for a period of 10 milliseconds (FIG. 3) over line 46 (FIG. 1) to the switch 36, thereby turning off the switch and preventing the power from being supplied over line 38 to the light source 16 (FIG. 1) of the optical wand 14 and the reader electronics 20.

Figure 3:
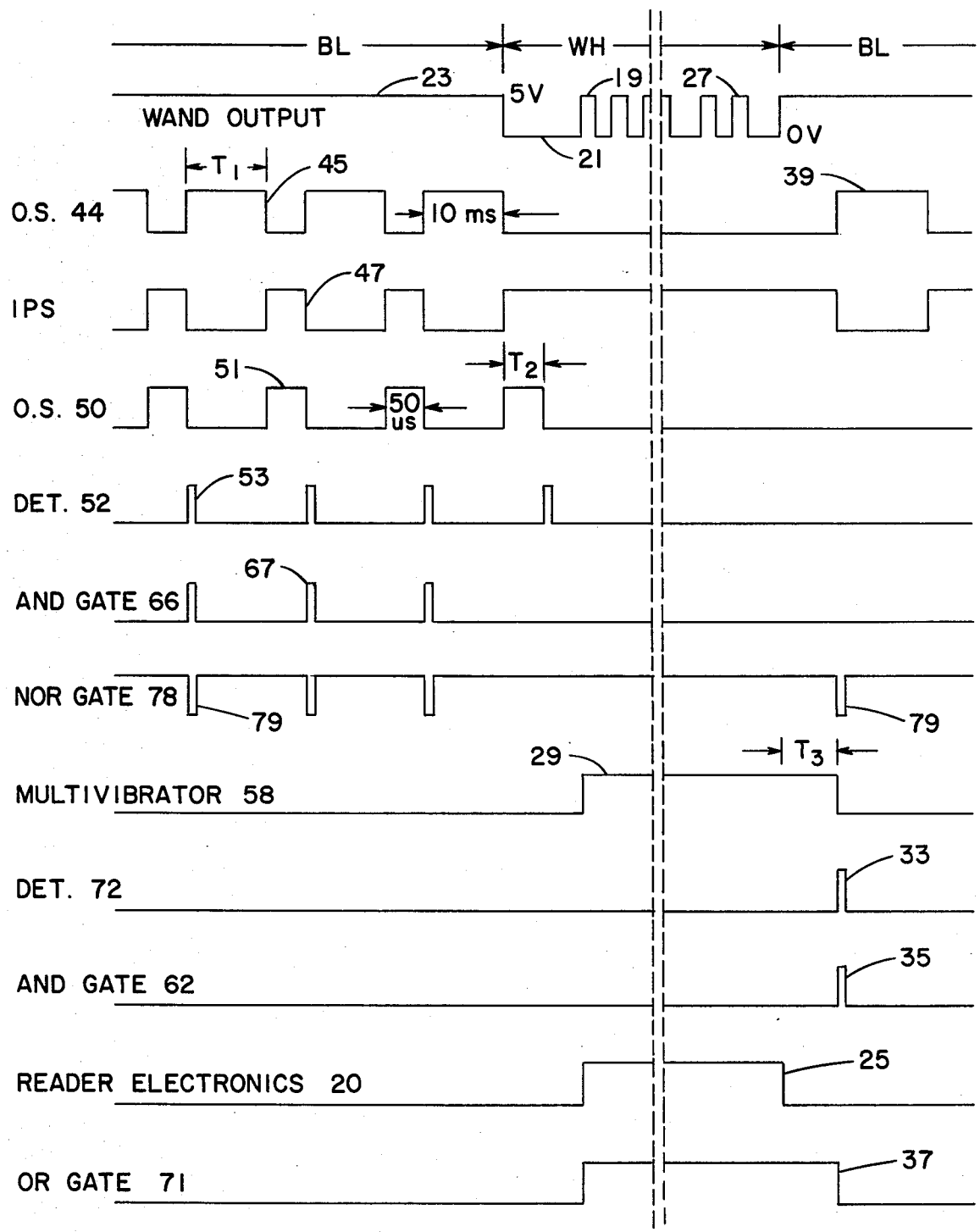
FIG. 3 illustrates the control pulses generated by the various elements of the control circuit.

As shown in FIG. 3, the 10 millisecond output of the multivibrator 44 is designated as $T_1$, while the output 47 of the switch 36 is indicated as the interrupted power supply (IPS). At the end of time $T_1$, the output of the multivibrator 44 will go low, triggering a second single shot multivibrator 50 to output a +5 volts pulse 51 (FIG. 3) for a period of 50 microseconds, which period is indicated as $T_2$ in FIG. 3. It will be seen from FIG. 3 that as the output of the multivibrator 44 goes low, and the multivibrator 50 goes high, the switch 36 is turned on, enabling the switch 36 to output the +5 volts pulse 47 over line 38. At the end of 50 microseconds, the output of the multivibrator 50 will go low, which is detected by the negative edge detector 52 and which outputs a +5 volts pulse 53 (FIG. 3) to the AND gate 66 (FIG. 1). As described previously, the AND gate 66 has been enabled by the 5 volts output pulse 23 (FIG. 3) received from the wand 14 and will output, upon receiving the pulse 53, the pulse 67 (FIG. 3) over line 80 (FIG. 1) to a NOR gate 78 which gates the negative pulse 79 (FIG. 3) over line 82 (FIG. 1) to the multivibrator 44 triggering the multivibrator 44 to output another 10 millisecond pulse 45 over line 46 to the switch 36 turning off the switch 36 and thereby the power supply to the reader electronics 20 and the wand 14 for a 10 millisecond period ($T_1$). It will be seen that as long as the optical wand 14 (FIG. 1) senses a black background or a non-reflective surface, the switch 36 will be intermittently turned off for a 10 millisecond period of time $T_1$ and turned on for a 50 microsecond period of time $T_2$ (FIG. 3) thereby reducing the amount of power being supplied to the reader electronics 20 and the wand 14 by the power supply 30 (FIG. 1).

Upon the positioning of the wand 14 adjacent a tag or article preparatory to reading a bar code, the sensor assembly 18 (FIG. 1) will sense the reflected light generated by the light source 16 which, as described previously, is energized during time $T_2$ prior to the sensing of a reflected surface, the light being reflected from the article or label. In a manner that is well known in the art, the output of the sensor assembly 18 will go low, indicated as level 21 in FIG. 3, in response to the sensing of the light reflected from a label notifying the reader electronics 20 over line 24 (FIG. 1) that a bar code is to be read, the output level 21 being also transmitted to the AND gate 66 over lines 54 and 64, disabling the AND gate. The disabling of the AND gate 66 at this time will result in its output going low which makes the output of the NOR gate 78 (FIG. 1) go high thereby disabling the multivibrator 44. When multivibrator 44 is disabled, its output will go low turning on switch 36, which allows the power supply 30 to apply +5 volts to the reader electronics 20 and to the wand 14 over line 38 to enable a bar code read operation to be initiated.

Upon sensing the first black bar of the bar code, the wand 14 will output data pulse 19 (FIG. 3) to the reader electronics 20 over line 24 for processing and to a single-shot multivibrator 58 over lines 54 and 56. Upon receiving the data pulse 19 from the wand 14, the reader electronics 20 will output a +5 volts pulse 25 (FIG. 3) over line 68 indicating that the data pulse 19 has been decoded and that a read operation has been initiated. The pulse 25 is transmitted over line 68 (FIG. 1) to one of the inputs of an OR gate 71. The other input of the OR gate 71 is connected over line 70 to the output of the multivibrator 58 which is operated by the data pulse 19 and has a one second timed output. The multivibrator 58 is of the retriggerable type so that each time a black bar is sensed by the wand 14, the multivibrator 58 will output a one second +5 volts pulse 29 (FIG. 3) over line 70 to OR gate 71. Since the black bars of the UPC code, as represented by the data pulses 19 (FIG. 3), are spaced at less than one second sensing intervals, the pulse 29 will be continuous to allow the wand 14 to read the bar code located on the article or record member. Upon the sensing of the last black bar of the code, represented as pulse 27 in FIG. 3, a one second time interval indicated as $T_3$ is effectively generated by the multivibrator 58. The last black bar pulse 27 constitutes an end of read character enabling the reader electronics 20 to sense the end of the read operation by the wand 14.

As shown in FIG. 3, upon the reader electronics 20 sensing the end of the read operation by the wand 14, and after the data has been transmitted to the CPU 26 (FIG. 1), the reader electronics 20 will pull down the 5 volts pulse 25 (FIG. 3) to a 0 volts level over line 68 to the OR gate 71. Since the OR gate 71 is connected to multivibrator 58 over line 70, the output of the OR gate 71 will stay high as long as either pulse 29 or pulse 25 stays high. This condition will insure a supply of power to the reader electronics 20 to complete the processing of the data sensed by the wand 14. Upon the last input pulse to the OR gate 71 going low, which in this instance is pulse 29 (FIG. 3) from multivibrator 58 occurring at the end of one second time period $T_3$, the output of the OR gate 71 will go low which output is detected by a negative edge detector 72 (FIG. 1) resulting in the outputting of the pulse 33 (FIG. 3) to an AND gate 62 (FIG. 1). Since at this time the wand 14 is outputting a +5 volts pulse as a result of the ending of the bar code read operation, which 5 volts pulse is transmitted over line 60 to the other input of the AND gate 62, the AND gate 62 will output the 5 volts pulse 35 (FIG. 3) to the NOR gate 78 over line 76 (FIG. 1) which gates the pulse 79 over line 82 to the multivibrator 44, enabling the multivibrator to output the pulse 39 (FIG. 3) over line 46 to the switch 36 (FIG. 1) thereby turning off the switch 36 and the interrupted power supply in the manner described previously. The circuit will now return to its interrupting operation and the switch 36 will be successively turned on for a period of 50 microseconds and turned off for a period of 10 milliseconds until the wand 14 senses the next article or tag on which is located the bar code that is to be read.

Figure 2:
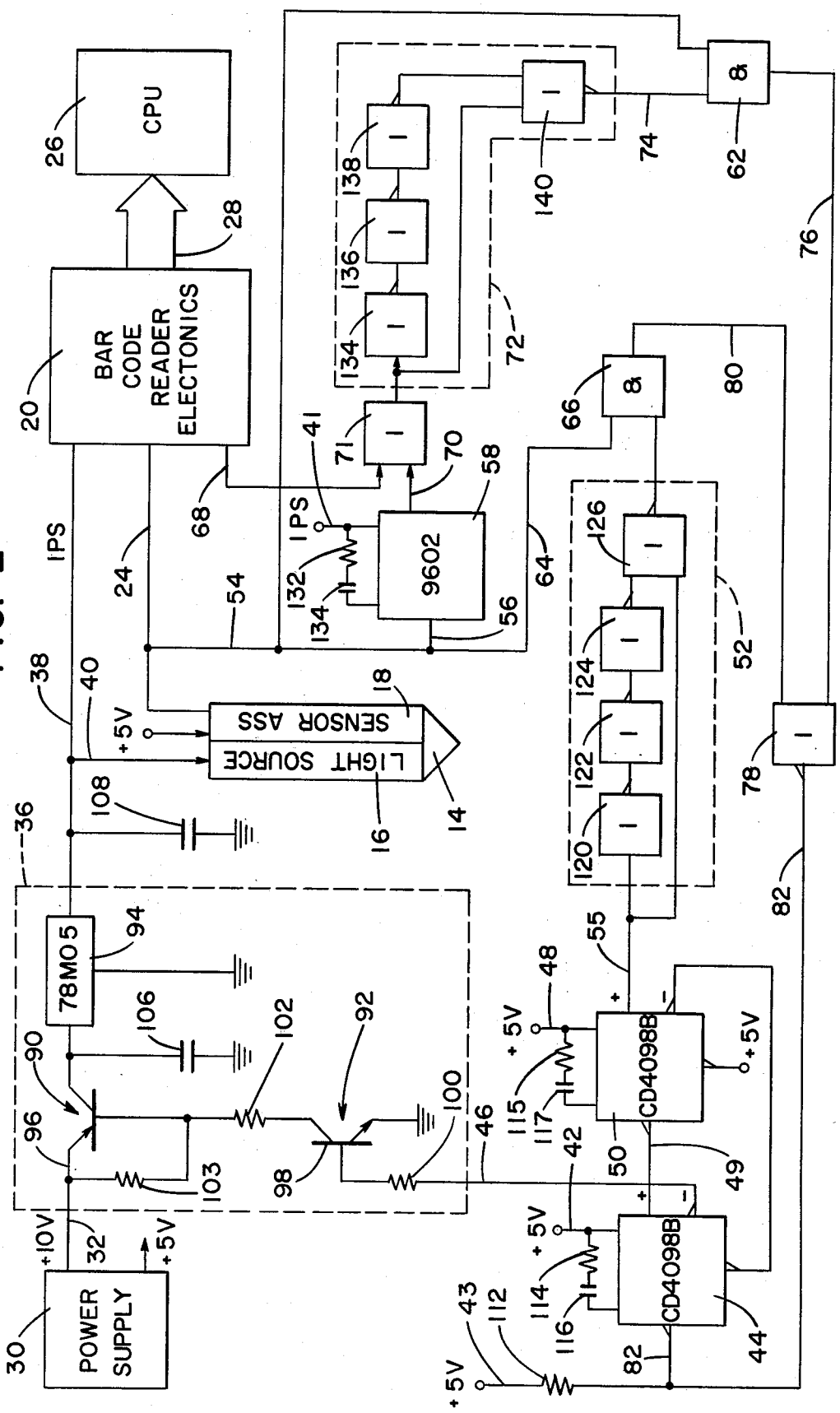
FIG. 2 illustrates a detailed circuit diagram of various elements of the control circuit.

Referring now to FIG. 2 there is shown a more detailed diagram of various elements which make up the power supply control circuit shown in FIG. 1. Included in the switch 36 are transistors 90 and 92 and a 78MO5 voltage regulator 94. The emitter 96 of the transistor 90 is connected to the +10 volts line 32 of the power supply 30, while the base 98 of the transistor 92 is connected to the negative output 46 of the multivibrator 44. When the negative output 46 of the multivibrator 44 goes high, the voltage developed by a dropping resistor 100 turns on the transistor 92 which also turns on the transistor 90, allowing the voltage appearing on the line 32 to be transmitted through the voltage regulator 94 to the output line 38, the voltage appearing on the output line 38 being at a level of +5 volts. Included in the transistor circuits are dropping resistors 102 and 103, together with a filter capacitor 106. A second filter capacitor 108 is connected to ground and to the output line 38 for filtering out the voltage pulse appearing on the output of the voltage regulator 94.

The multivibrators 44 and 50 are of the same construction with the input line 82 of the multivibrator 44 being connected to the uninterrupted +5 volts power supply line 43 through a pull-up resistor 112 which provides a high input to multivibrator 44 when the NOR gate 78 is not connected to the power supply. Also included in the multivibrator 44 is an RC timing circuit composed of resistor 114 and capacitor 116 connected to the uninterrupted power supply of 5 volts over line 42. When the multivibrator 44 is disabled at the end of its 10 millisecond operation, the negative output line 46 of the multivibrator 44 will be outputting a high pulse over line 46 to the base 98 of the transistor 92 enabling the transistor and thereby enabling the switch 36 to transmit the 5 volts power supply over lines 38 and 40 to the reader electronics 20 and the wand 14. During the time that the negative output line 46 of the multivibrator 44 is high, the positive output line 49 will be outputting 0 volts to the multivibrator 50 thereby disabling the operation of the multivibrator 50.

Upon the transmission of the negative 5 volts pulse 79 over line 82 to the multivibrator 44 from the NOR gate 78, the pulse 45 (FIG. 3) on the positive output line 49 will go high for a period of 10 milliseconds and the negative output 46 will go low for the same time period disabling the transistors 90, 92 and the voltage regulator 94 thus interrupting the +5 volts power supply to the wand 14 and the reader electronics 20. This sequence of events occur each time the multivibrator 44 is triggered for a 10 millisecond operation. At the end of 10 milliseconds, the pulse 45 on the positive output line 49 will go low, resulting in the enabling of the multivibrator 50 to output a high pulse 51 (FIG. 3) over the positive output line 55. At the end of T₂ or 50 microseconds, the pulse 51 on line 55 will go low which is sensed by the negative edge detector 52. The negative edge detector 52 is of standard construction and consists of inverters 120-124 inclusive and a NOR gate 126 to output the pulse 53 (FIG. 3) to one input of the AND gate 66 upon sensing the negative going edge of pulse 51 (FIG. 3). The other input to the AND gate 66 at this time is also at a +5 volts due to the wand 14 sensing a non-reflecting surface. The AND gate 66 will gate the 5 volts pulse 67 (FIG. 3) over line 80 through the OR gate 78 and over line 82 to the input of the multivibrator 44 triggering the multivibrator 44 in the manner described previously.

The multivibrator 58 operated when its input pulse 19 goes from low to high includes the RC timing circuit comprising the resistor 132 and the capacitor 134 which triggers the multivibrator to output a one second pulse 29 (FIG. 3) to the OR gate 71 which in turn gates the pulse to the negative edge detector 72, the latter comprising inverters 134-138 inclusive, together with a NOR gate 140 wired in the same manner as that of negative edge detector 52. The RC timing circuit is connected over line 41 to line 38 (FIG. 1) which receives the interrupted 5 volts pulse only when the switch 36 is turned on. The multivibrator 58 used in the present control circuit may be item number 9602 manufactured by Fairchild Semiconductor, Inc., while multivibrators 44 and 50 may be number CD 4098B manufactured by RCA Corporation. The voltage regulator 94 may be item number 78MO5 manufactured by Fairchild Semiconductor. The RC timing circuit of multivibrator 44 may comprise a 200K resistor 114 and a 0.1 micro F capacitor 116. The RC timing circuit of the multivibrator 50 may include a 50K resistor 115 and a 1000 pf capacitor 117. The RC timing circuit of the multivibrator 58 may include a 150K resistor 132 and a 22 F capacitor 134. The dropping resistor 100 may have a value of 10K, while the resistor 102 is 100 ohms and resistor 103 is 1K. The filter capacitor 106 may be a 0.33.

F while the filter capacitor 108 may be 1 F.

Although the control circuit described herein has been shown in one specific embodiment, various modifications and changes can be made without departing from the spirit and scope of the invention which is defined by the following claims.

What is claimed is:

1. A circuit for intermittently supplying power to a sensing system comprising,
    (a) sensing means for providing a first control signal when in a sensing position and a second control signal when in a non-sensing position;
    (b) switch means operable to supply power to the sensing system;
    (c) first circuit means coupled to said sensing means and said switch means, said circuit means including a plurality of first signal generating means for intermittently enabling said switch means for a first predetermined time period and disabling said switch means for a second predetermined time period in response to the generation of said second control signal by said sensing means, said circuit means being disabled upon the generation of said first control signal by said sensing means to enable said switch means to supply power to the sensing system;
    (d) and second circuit means coupled to said sensing means and said first circuit means, said second circuit means includes a second signal generating means operated to maintain said first circuit means in a disabled condition for a third predetermined time period in response to the generation of said first control signal by said sensing means whereby the switch means is enabled to supply power to the sensing means for said third predetermined time period.

2. The circuit of claim 1 in which said first signal generating means includes a first monostable means coupled to said switch means and operated in response to the generation of said second control signal to disable the switch means from operating during said second predetermined time period, said monostable means enabling said switch means for operation at the conclusion of said second predetermined time period.

3. The circuit of claim 2 in which said first signal generating means includes:
   (a) a second monostable means coupled to said first monostable means and operated in response to the operation of said switch means by said first monostable means at the end of said second predetermined time period to issue a third control signal for said first predetermined time period;
   (b) and said first circuit means includes means coupled to said second monostable means for operating said first monostable means at the conclusion of said first predetermined time period.

4. The circuit of claim 3 in which said second signal generating means includes:
   (a) a third monostable means coupled to said sensing means and operated in response to the generation of said first control signal to issue a fourth control signal for said third predetermined time period;
   (b) means coupled to said third monostable means for generating a fifth control signal at the conclusion of said first predetermined time period;
   (c) and gate means coupled to said sensing means and said signal generating means for operating said first monostable means upon the simultaneous occurrence of said second and fifth control signals.

5. The circuit of claim 3 in which said operating means includes:
   (a) detector means coupled to said second monostable means for issuing a fourth control signal at the conclusion of said third first predetermined time period;
   (b) and gate means coupled to said sensing means and said detector means for operating said first monostable means upon the simultaneous occurrence of said second and fourth control signals.

6. The circuit of claim 3 in which the ratio of said second predetermined time period to said first predetermined time period is 200 to 1.

7. A control circuit for intermittently supplying power to a system for optically reading bar code data comprising:
   (a) sensing means for generating a first signal when sensing a bar code and a second signal when not sensing a bar code, said sensing means generating data signals representing the bar code sensed;
   (b) processing means coupled to said sensing means for processing the data signals representing the bar code sensed;
   (c) a voltage source;
   (d) a switch member coupled to said voltage source for supplying power to said sensing and processing means when enabled;
   (e) first circuit means coupled to said sensing means and said switching means, said circuit means including a plurality of first signal generating means for intermittently enabling the switch member for a first predetermined time period and disabling the switch member for a second predetermined time period in response to the generation of said second control signal;
   (f) and second circuit means coupled to said sensing means and said first circuit means, said second circuit means includes a second signal generating means for disabling the operation of said first circuit means for a third predetermined time period in response to the generation of said first control signal by said sensing means whereby the switch member is operated to supply power to the sensing means and the processing means for said third predetermined time period.

8. The control circuit of claim 7 in which said first signal generating means includes a first monostable means coupled to said switch member and said sensing means and operated in response to the generation of said second control signal to output a third control signal to said switch member for said second predetermined time period disabling said switch member from operating during said second predetermined time period thereby disabling the operation of said sensing means and said processing means during said second predetermined time period, said monostable means outputting a fourth control signal at the end of said second predetermined time period.

9. The control circuit of claim 8 in which said first signal generating means further includes:
   (a) a second monostable means coupled to said first monostable means and operated in response to the generation of said fourth control signal to output a fifth control signal for said first predetermined time period and a sixth control signal at the end of said first predetermined time period;
   (b) and said first circuit means includes first gate means coupled to said sensing means and said second monostable means for operating said first monostable means upon the simultaneous occurrence of said second and sixth control signals.

10. The control circuit of claim 9 in which said second signal generating means includes:
    (a) third monostable means coupled to said sensing means and operated in response to the generation of said first control signal to issue a seventh control signal for said first predetermined time period;
    (b) said second circuit means includes means coupled to the output of said third monostable means for generating a eighth control signal at the conclusion of said first predetermined time period;
    (c) and second gate means coupled to said sensing means and said second signal generating means for operating said first monostable means upon the simultaneous occurrence of said second and eighth control signals.

11. The control circuit of claim 10 in which said processing means outputs an ninth control signal at the end of a bar code sensing operation, said second signal generating means further includes third gate means coupled to the output of said processing means and said third monostable means for outputting a tenth control signal upon the outputting of said ninth control signal or the conclusion of said first predetermined time period, whichever occurs last.

12. The control circuit of claim 11 in which said second signal generating means further includes a detector means coupled to the output of said third gate means for generating said eighth control signal upon the occurrence of said tenth control signal.

13. The control circuit of claim 9 in which the ratio of said second predetermined time period to said first predetermined time period is 200 to 1.

14. A power supply system capable of supplying an operating potential to a utilization means having a first operative condition when positioned adjacent a non-reflective surface and a second operative condition when positioned adjacent a relative surface, comprising:

a source of operating potential;

means for providing a first signal in response to the first operative condition of said utilization means and a second signal in response to the second operative condition thereof; and means responsive to said first signal for continuously coupling said operating potential to said utilization means for a first predetermined time period and uncoupling said operating potential for a second predetermined time period during the time said utilizing means is located adjacent a non-reflective surface and responsive to said second signal for continuously coupling said operating potential to said utilization means for a third predetermined time period following the occurrence of said second signal during the time said utilizing means is located adjacent a reflective surface.

* * * * *